No. 744,154. PATENTED NOV. 17, 1903.
G. M. BATES.
GATE.
APPLICATION FILED JULY 10, 1903.
NO MODEL. 2 SHEETS—SHEET 2.
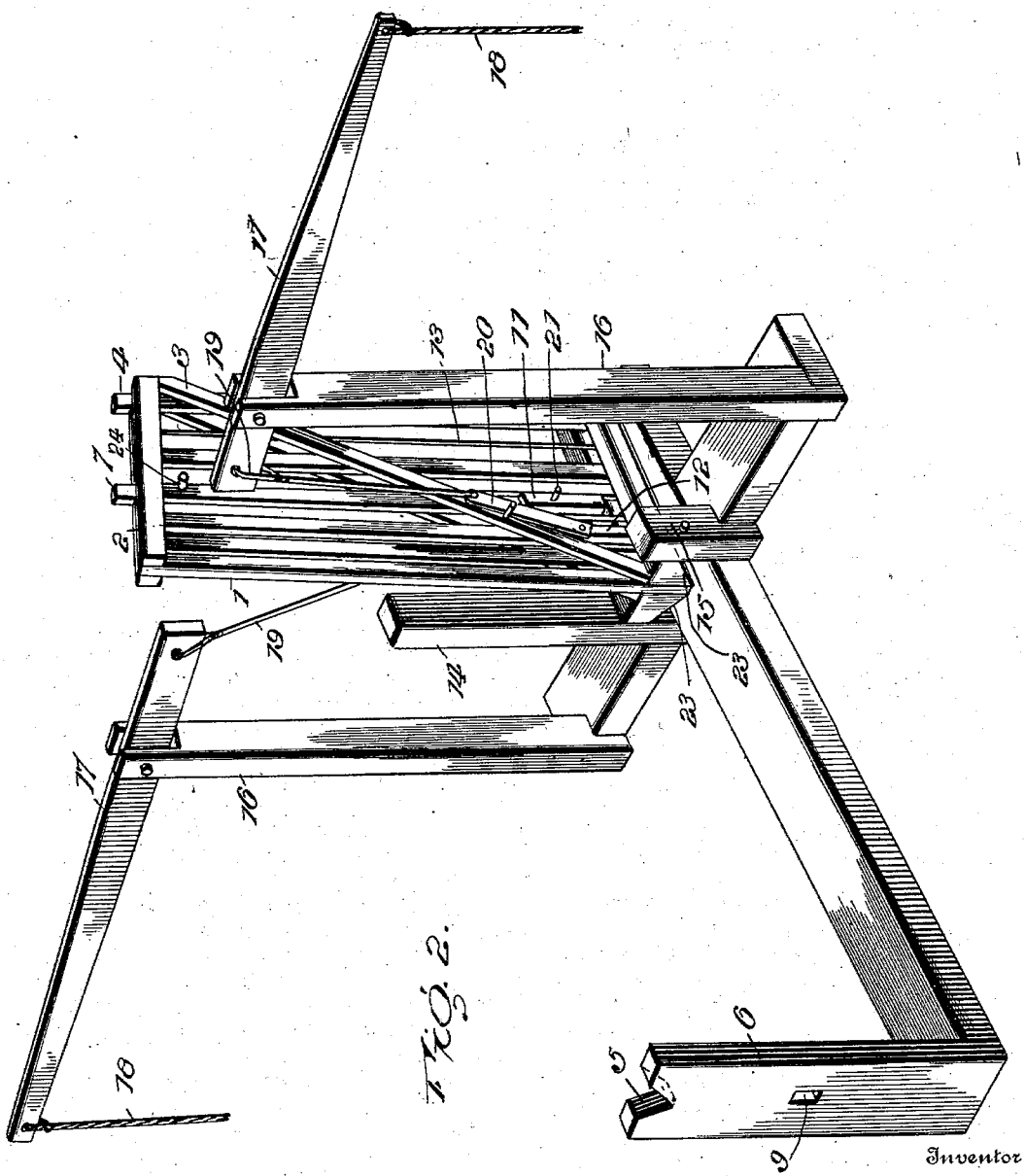

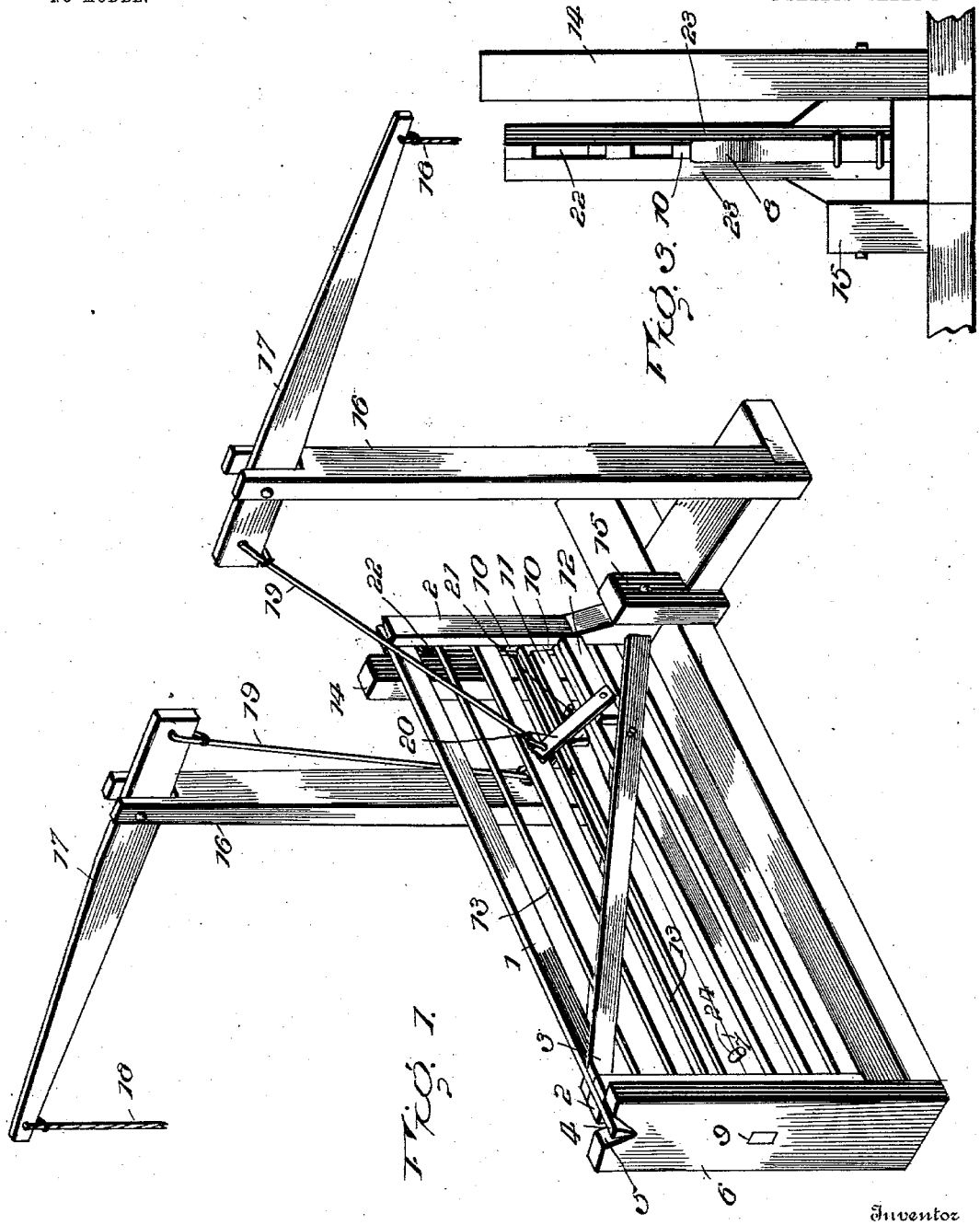

No. 744,154. Patented November 17, 1903.

UNITED STATES PATENT OFFICE.

GEORGE M. BATES, OF GAULT, MISSOURI.

GATE.

SPECIFICATION forming part of Letters Patent No. 744,154, dated November 17, 1903.

Application filed July 10, 1903. Serial No. 165,009. (No model.)

*To all whom it may concern:*

Be it known that I, GEORGE M. BATES, a citizen of the United States, residing at Gault, in the county of Grundy and State of Missouri, have invented certain new and useful Improvements in Gates, of which the following is a specification.

This invention relates to an improved structure of gate for railways, roads, or analogous uses. The gate is of the tilting type embodying the use of operating-levers disposed upon opposite sides thereof and adapted to be manipulated by the passer-by as he approaches the gate to open same and after he has passed through the gate to close the same.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of the gate, showing the same closed. Fig. 2 is a perspective view showing the gate open. Fig. 3 is a rear view of the gate, showing more particularly the construction of the rear portion thereof.

Corresponding and like parts are referred to in the following description and indicated in all the views of the drawings by the same reference characters.

The gate comprises the usual longitudinal bars 1 and the end bars 2. Diagonally-disposed bars 3 are preferably located upon either side of the gate both to strengthen the same and for a purpose which will appear as the description proceeds. The uppermost of the longitudinal bars 1 is provided with an extension 4, which extension is preferably of angular form in cross-section and adapted to rest in an angular recess 5 upon the upper end of the latch-post 6 when the gate is closed. The purpose of this extension is to rigidly hold the gate, so as to prevent any lateral play and at the same time relieve the strain upon the latch-bar 7, upon which said strain would otherwise be received. The latch-bar 7 extends the length of the gate and is adapted under the normal tension of the spring 8 to extend into the opening 9 upon the latch-post 6. The rear end of the latch-bar 7 is received between guide-blocks 10, disposed intermediate the rear spaced end bars 2. Upon either side of the end portion of the latch-bar 7 are disposed bars 11, which are rigidly secured to the latch-bar in any suitable manner. Correspondingly-disposed bars 12 are located upon the end portion of one of the longitudinal bars 1, disposed immediately beneath the latch-bar. As will be readily noted by reference to the drawings, the longitudinal wires 13 are preferably used to strengthen the gate structure, as clearly shown. The gate when used with fence structures is pivoted at the lower rear end thereof between the fence-post 14 and an auxiliary post 15, disposed adjacent thereof, said post 15 being shorter than the post 14.

Located some distance from the gate and upon both sides thereof are uprights or posts 16, to which are pivoted the operating-levers 17. The operating-levers are provided at their outer ends with pull-cords 18, by which the said levers may be manipulated so as to either open or close the gate. The inner ends of the operating-levers 17 are connected by flexible connections 19, of rope, wire, or the like, to bars 20, which are pivoted to the bars 12 and by which the gate is directly actuated so as to be either opened or closed. The bars 20 are located upon both sides of the gate and coöperate with projections 21, extended from the bars 11 upon the latch-bar, and similar projections extended in opposite directions and located upon the diagonally-disposed gate-bars 3.

A weight 22 is disposed between the upper end portions of the rear end bars 2 of the gate, said weights being necessary to the perfect operation of the gate when same is thrown open or thrown into its closed position. The proper operation of this character of gates is very often impeded by snow, which may accumulate in rear of the device and prevent the gate from being thrown open. In order to obviate this defect in the general structure of the gate, the rear sides of the rear end bars are beveled, as shown at 23, in such a manner that the weight of the gate when same is thrown open will permit of what may be characterized as a "cutting action" upon the part of the rear end of the said gate, due to the peculiar construction of the rear end bars, which will allow the gate to be thrown into the open position, as shown in Fig. 2. Should it be desired to open the gate by hand, the handles 24 upon the forward end of the latch-bar 7 may be used to cause disengagement of the latch-bar from the latch-post.

The operation of the gate is simple. As the passer-by approaches the gate it is only necessary to pull upon the pull-cord 18 of the lever adjacent him, and an upward movement of the lever will exert a rearward pressure upon the latch-bar 7 through the medium of one of the pivoted bars 20, said bar abutting against the projection upon the said latch-bar 7 and causing the disengagement of the said latch-bar from the latch-post. The gate in its open position is closed after the passer-by has passed therethrough by operating the lever upon the opposite side of the gate so as to cause the coöperating bar 20, to which said lever is connected, to strike the projection upon the adjacent diagonally-disposed gate-bar, and thus the gate will be thrown back into its closed position.

While the several posts 6, 15, and 16 are shown mounted upon sills, it is to be understood that in practice they will be set in the ground and the earth tamped about them to provide a substantial structure.

Having thus described the invention, what is claimed as new is—

1. In combination, a gate comprising longitudinally-disposed bars and spaced end bars, a latch-bar mounted for slidable movement upon the gate, pivot means disposed for coöperation with the lower rear end portion of the gate, uprights disposed at a distance from and upon either side of the gate, operating-levers pivoted to the said uprights, spaced projections located upon either side of the gate, bars pivoted adjacent the said projections for coöperation therewith to open or close the gate, and connecting means between the upper ends of the aforesaid bars and the inner ends of the operating-levers.

2. The combination, with a gate comprising longitudinal bars, spaced end bars secured to the said longitudinal bars, the uppermost longitudinal bar having an angular extension projected beyond the adjacent spaced end bar, a latch-post provided upon its upper end with an angular recess to receive the aforesaid angular projection upon the uppermost gate-bar, a latch-bar mounted for longitudinal movement upon the gate having its end portions disposed intermediate the spaced end bars of the gate, bars fixedly secured to the corresponding sides of the latch-bar, diagonally-disposed gate-bars, spaced projections extended from the aforesaid bars upon the latch-bar and from the diagonally-disposed gate-bars, uprights spaced from the gate upon either side thereof, operating-levers pivoted to the aforesaid uprights, corresponding bars pivoted to opposite sides of the gate and adapted to coöperate with the projections aforesaid to open and close the gate, and means connecting the inner ends of the operating-levers and the aforesaid pivoted bars of the gate.

3. The combination with a gate comprising longitudinally-disposed bars and spaced end bars, of a latch-post having an angular recess upon its upper end, an angular extension disposed upon the upper end of the gate and adapted to be received within the angular recess of the latch-post, pivot means disposed adjacent the lower rear end portion of the gate, a latch-bar mounted for longitudinal movement upon the gate and having its rear end disposed intermediate the spaced end bars, guide-blocks provided upon the rear spaced end bars and adapted to guide the latch-bar in its movement, a weight located intermediate the said spaced end bars adjacent the upper ends thereof, said end bars having their faces beveled, diagonally-disposed gate-bars, projections extended upon opposite sides of the gate and disposed upon corresponding sides of the latch-bar and corresponding sides of the diagonally-disposed gate-bars, uprights spaced upon either side of the gate, operating-levers pivoted to the said uprights, bars pivoted to opposite sides of the gate and adapted to coöperate with the corresponding projections aforesaid, and connecting means between the inner ends of the operating-levers and the upper ends of the aforesaid pivoted bars.

In testimony whereof I affix my signature in presence of two witnesses.

GEORGE M. BATES. [L. S.]

Witnesses:
JOSEPH VAN METER,
W. A. FULKERSON.